United States Patent
Zhang et al.

(10) Patent No.: US 11,611,252 B2
(45) Date of Patent: Mar. 21, 2023

(54) DRIVING MOTOR WITH HYBRID EXCITATION OF ELECTROMAGNETISM AND INVISIBLE MAGNETIC POLE

(71) Applicant: Shandong University Of Technology, Zibo (CN)

(72) Inventors: Xueyi Zhang, Zibo (CN); Wenjing Hu, Zibo (CN); Yulong Lei, Zibo (CN); Shanjian Wang, Zibo (CN); Hongbin Yin, Zibo (CN); Huihui Geng, Zibo (CN)

(73) Assignee: Shandong University of Technology, Zibo (CN)

( * ) Notice: Subject to any disclaimer, the term of this patent is extended or adjusted under 35 U.S.C. 154(b) by 26 days.

(21) Appl. No.: 17/044,070

(22) PCT Filed: Apr. 15, 2020

(86) PCT No.: PCT/CN2020/084842
§ 371 (c)(1),
(2) Date: Sep. 30, 2020

(87) PCT Pub. No.: WO2020/216108
PCT Pub. Date: Oct. 29, 2020

(65) Prior Publication Data
US 2022/0393532 A1    Dec. 8, 2022

(30) Foreign Application Priority Data
Apr. 23, 2019    (CN) .......................... 201910329642.9

(51) Int. Cl.
*H02K 1/27*    (2022.01)
*H02K 1/276*    (2022.01)
*H02K 15/03*    (2006.01)

(52) U.S. Cl.
CPC ........... *H02K 1/2766* (2013.01); *H02K 15/03* (2013.01)

(58) Field of Classification Search
CPC ........ H02K 1/2766; H02K 15/03; H02K 1/27; H02K 21/02; Y02T 10/64
See application file for complete search history.

(56) References Cited

U.S. PATENT DOCUMENTS

| 2013/0113325 A1* | 5/2013 | Saito .................... H02K 1/2766 310/156.12 |
| 2014/0132094 A1 | 5/2014 | Chamberlin et al. |
| 2017/0063187 A1* | 3/2017 | Hao ....................... H02K 21/14 |

FOREIGN PATENT DOCUMENTS

| CN | 104485762 A | 4/2015 |
| CN | 105871151 A | 8/2016 |
| CN | 109951037 A | 6/2019 |

* cited by examiner

Primary Examiner — Thomas Truong
(74) Attorney, Agent, or Firm — Fox Rothschild LLP

(57) ABSTRACT

An driving motor with hybrid excitation of electromagnetism and invisible magnetic pole, wherein each magnetic pole comprises two first magnets, one second magnet and one third magnet; wherein the first magnet is placed along a diameter direction of a rotor core, the second magnet is located at a middle and lower portion of two first magnets of each magnetic pole corresponding to the second magnet at a diameter direction, and a magnetic isolation groove is disposed at an inner end of the first magnet and extends toward two sides of the inner end of the first magnet. The magnetic isolated air gap can adjust a spatial distribution of a magnetic field generated by permanent magnets of each pole to replace the permanent magnets, so as to save the number of the permanent magnets, reduce the weight of the motor, and reduce the cost of the motor.

3 Claims, 2 Drawing Sheets

DRIVING MOTOR WITH HYBRID EXCITATION OF ELECTROMAGNETISM AND INVISIBLE MAGNETIC POLE

CROSS-REFERENCE TO RELATED APPLICATIONS

The present application claims priority to International Application No. PCT/CN2020/084842, filed Apr. 15, 2020, which claims priority to Chinese Patent Application No. 201910329642.9, filed Apr. 23, 2019, which are incorporated herein by reference in their entirety.

TECHNICAL FIELD

The disclosure relates to the technical field of motor and electric appliance of electric vehicles, in particular to a driving motor with hybrid excitation of electromagnetism and invisible magnetic pole.

BACKGROUND ART

Currently, rotors of permanent magnetic driving motors adopted on the electric vehicles mostly adopts an externally embedded structure of permanent magnets. As in the conventional art, Chinese Patent Application Publication No. CN 104485762 A, entitled "Rotor of Permanent Magnet Synchronous Motor and Permanent Magnet Synchronous Motor" has disclosed following technical solutions: even numbers of tangential permanent magnets being distributed evenly along radial direction of a rotor core, same polarities of two adjacent tangential permanent magnets being opposite, one radial permanent magnet being symmetrically arranged on each of both sides of one end of each tangential permanent magnet close to the inner side of the rotor core. The radial permanent magnet of the rotor with such a structure is to solve the problems of large magnetic flux leakage of rotor and low utilization rate of the permanent magnet of the permanent magnet synchronous motor. However, the increase of the radial permanent magnet results in an increase in the overall weight of the motor rotor, a waste of permanent magnetic materials, and a low overall performance of the motor. It is therefore necessary to further improve the use performance thereof.

SUMMARY

The disclosure provides a driving motor with hybrid excitation of electromagnetism and invisible magnetic pole, in which the permanent magnet is replaced with a magnetic isolated air gap to improve the magnetic field distribution of the motor, so as to achieve a small magnet flux leakage of rotor, a high utilization rate of the permanent magnet and a light weight, which can overcome the foregoing defects.

The technical solution provided by the disclosure is: a driving motor with hybrid excitation of electromagnetism and invisible magnetic pole, comprising a front end cover, a rear end cover, a housing, a hybrid excitation rotor and a stator; wherein, the hybrid excitation rotor comprises an electric excitation rotor with a carbon brush slip ring structure and an invisible permanent-magnet rotor;

wherein the invisible permanent-magnet rotor comprises a shaft, a rotor core, and a magnetic isolated air gap; wherein even numbers of magnetic poles are distributed evenly on the rotor core, each of the magnetic poles is oriented along a circumferential direction of the rotor core; wherein each of the magnetic poles comprises two first magnets, one second magnet and one third magnet; wherein a length of an outer circular arc of the rotor corresponding to each magnetic pole is equal to a length of a corresponding outer circular arc of the rotor between two adjacent magnetic poles; wherein the first magnet and the second magnet are both rectangular permanent alnicos, the third magnet is a circular-arc-shaped magnet; wherein the first magnet is placed along a diameter direction of the rotor core, and an outer end of the first magnet is disconnected from an outer circle of the rotor core; wherein the second magnet is disposed in the middle of two first magnets in each magnetic pole along a direction parallel to a cross-sectional circumferential chord of the rotor core, the second magnet is located at a middle and lower portion of two first magnets of each magnetic pole corresponding to the second magnet at a diameter direction, and a length of the second magnet in a perpendicular direction to the diameter is less than ⅔ of a length between inner ends of two adjacent first magnets; wherein the third magnet is disposed at a middle of outer ends of the two adjacent first magnets, and a diameter of the third magnet is equal to the length of the second magnet in the perpendicular direction to the diameter; wherein the magnetic isolated air gap passing through the rotor core is disposed at an inner end of the first magnet, the magnetic isolated air gap extends from the inner end of the first magnet to two sides of the inner end of the first magnet, an intermediate outer side of the magnetic isolated air gap is connected to the first magnet, a left side of the magnetic isolated air gap extends to a right end of a second magnet adjacent to the left side of the magnetic isolated air gap, the left side of the magnetic isolated air gap is disconnected with the right end of the second magnet adjacent to the left side of the magnetic isolated air gap, and the magnetic isolated air gap is symmetric with respect to the first magnet; and wherein the rotor core is press-fitted on the shaft.

Optionally, wherein polarities of outsides of the two first magnets, a polarity of an outside of the second magnet and a polarity of an outside of the third magnet in a single magnetic pole of the rotor core are the same N poles; and a polarity of an intermediate portion of two adjacent magnetic poles is collectively formed by S poles of the first magnets, the second magnets and the third magnets of the two adjacent magnetic poles through the rotor core as an invisible S pole.

Optionally, wherein a thickness of the second magnet in a magnetizing direction is smaller than a thickness of the first magnet in the magnetizing direction, and a thickness of the third magnet in the magnetizing direction is smaller than the thickness of the second magnet in the magnetizing direction.

Working principle of the driving motor is that:

After the driving motor was input a three-phase alternating current through Pulse Width Modulation by a three-phase inverter, a stator of the driving motor generates a spatial rotation magnetic field, which interacts with a magnetic field generated by the rotor, so the rotor generates a rotation torque coinciding with a direction of a rotation magnetic field of the stator winding, to rotate the rotor of the driving motor, so as to drive the electric vehicle.

Following beneficial effects are provided by the disclosure:

The disclosure provides a driving motor with hybrid excitation of electromagnetism and invisible magnetic pole, wherein the magnetic isolated air gap extends from the inner end of the first magnet to the both sides of the inner end of the first magnet. Since the magnetic isolated air gap can obstruct a passage of magnetic field, regardless of whether there are magnetic poles of the second magnet and the third magnet, the magnetic field of each pole will be concentrated in the middle of each pole arc as much as possible, so the magnetic isolated air gap can adjust a spatial distribution of a magnetic field generated by permanent magnets of each pole to replace the permanent magnets, ao as to save the number of the permanent magnets, reduce the weight of the motor, and reduce the cost of the motor.

DETAILED DESCRIPTION OF THE EMBODIMENTS

The disclosure will be further described in details below combined with the accompanying drawings, so that those skilled in the art can implement the disclosure with reference to the text of the description.

The driving motor with hybrid excitation of electromagnetism and invisible magnetic pole comprises a front end cover 2, a rear end cover 9, a housing 5, a hybrid excitation rotor and a stator 6. Wherein, the hybrid excitation rotor comprises an electric excitation rotor with a carbon brush slip ring structure and an invisible permanent-magnet rotor.

Figure 1:
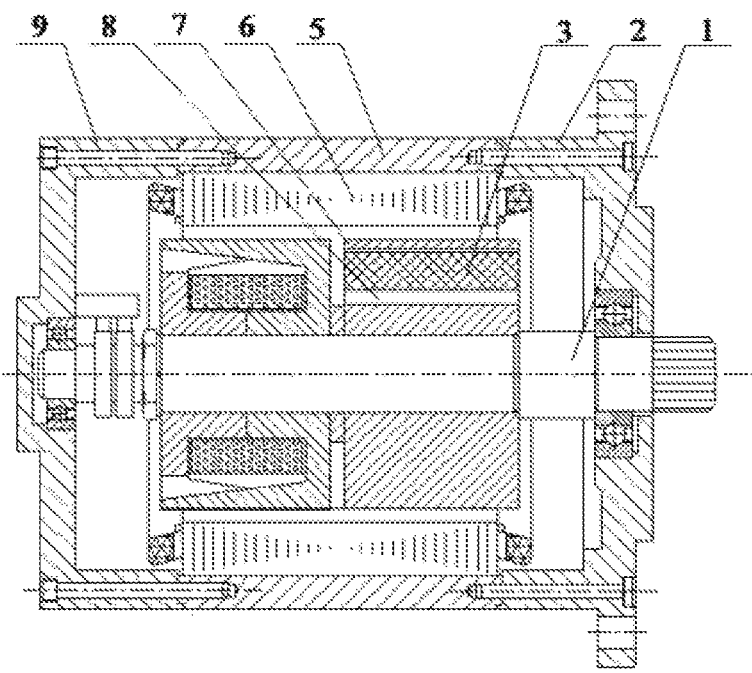
FIG. 1 is a schematic sectional structure view of the driving motor with hybrid excitation of electromagnetism and invisible magnetic pole according to the disclosure.
Figure 2:
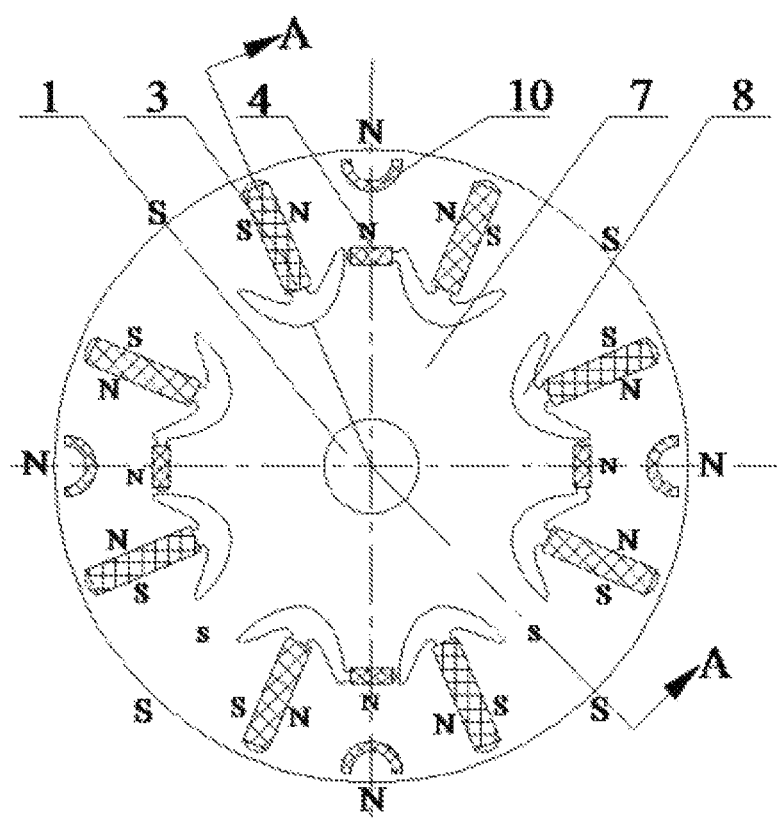
FIG. 2 is a schematic sectional structure view of the permanent-magnet rotor according to the disclosure.

The invisible permanent-magnet rotor comprises a shaft 1, a rotor core 7, and a magnetic isolated air gap 8. Even numbers of magnetic poles are distributed evenly on the rotor core 7, each of the magnetic poles is oriented along a circumferential direction of the rotor core 7. Each of the magnetic poles comprises two first magnets 3, one second magnet 4 and one third magnet 10. A length of an outer circular arc of the rotor corresponding to each magnetic pole is equal to a length of a corresponding outer circular arc of the rotor between two adjacent magnetic poles. The first magnet 3 and the second magnet 4 are both rectangular permanent alnicos, the third magnet 10 is a circular-arc-shaped magnet. The first magnet 3 is placed along a diameter direction of the rotor core 7, and an outer end of the first magnet 3 is disconnected from an outer circle of the rotor core 7. The second magnet 4 is disposed in the middle of two first magnets 3 in each magnetic pole along a direction parallel to a cross-sectional circumferential chord of the rotor core 7, the second magnet 4 is located at a middle and lower portion of two first magnets 3 of each magnetic pole corresponding to the second magnet 4 at a diameter direction, and a length of the second magnet 4 in a perpendicular direction to the diameter is less than ⅔ of a length between inner ends of two adjacent first magnets 3. The third magnet 10 is disposed at a middle of outer ends of the two adjacent first magnets 3, and a diameter of the third magnet 10 is equal to the length of the second magnet 4 in the perpendicular direction to the diameter. The magnetic isolated air gap 8 passing through the rotor core 7 is disposed at an inner end of the first magnet 3, the magnetic isolated air gap 8 extends from the inner end of the first magnet 3 to two sides of the inner end of the first magnet 3, and an intermediate outer side of the magnetic isolated air gap 8 is connected to the first magnet 3. Taking the counterclockwise rotation direction as a direction from left to right, as shown in FIG. 2, a left side of the magnetic isolated air gap 8 extends to a right end of a second magnet 4 adjacent to the left side of the magnetic isolated air gap 8, the left side of the magnetic isolated air gap 8 is disconnected with the right end of the second magnet 4 adjacent to the left side of the magnetic isolated air gap 8, a left end of the second magnet 4 is connected with a right side of the magnetic isolated air gap 8 adjacent to left end of the second magnet 4. The magnetic isolated air gap 8 is symmetric with respect to the first magnet 3, and the rotor core 7 is press-fitted on the shaft 1.

Polarities of outsides of the two first magnets 3, a polarity of an outside of the second magnet 4 and a polarity of an outside of the third magnet 10 in a single magnetic pole of the rotor core 7 are the same N poles; and a polarity of an intermediate portion of two adjacent magnetic poles is collectively formed by S poles of the first magnets 3, the second magnets 4 and the third magnets 10 of the two adjacent magnetic poles through the rotor core 7 as an invisible S pole.

A thickness of the second magnet 4 in a magnetizing direction is smaller than a thickness of the first magnet 3 in the magnetizing direction, and a thickness of the third magnet 10 in the magnetizing direction is smaller than the thickness of the second magnet 4 in the magnetizing direction.

The invention claimed is:

1. A driving motor with hybrid excitation of electromagnetism and invisible magnetic pole, comprising a front end cover (2), a rear end cover (9), a housing (5), a hybrid excitation rotor and a stator (6); wherein, the hybrid excitation rotor comprises an electric excitation rotor with a carbon brush slip ring structure and an invisible permanent-magnet rotor;

wherein the invisible permanent-magnet rotor comprises a shaft (1), a rotor core (7), and a magnetic isolated air gap (8); wherein even numbers of magnetic poles are distributed evenly on the rotor core (7), each of the magnetic poles is oriented along a circumferential direction of the rotor core (7); wherein each of the magnetic poles comprises two first magnets (3), one second magnet (4) and one third magnet (10); wherein a length of an outer circular arc of the rotor corresponding to each magnetic pole is equal to a length of a corresponding outer circular arc of the rotor between two adjacent magnetic poles; wherein the first magnet (3) and the second magnet (4) are both rectangular permanent alnicos, the third magnet (10) is a circular-arc-shaped magnet; wherein the first magnet (3) is placed along a diameter direction of the rotor core (7), and an outer end of the first magnet (3) is disconnected from an outer circle of the rotor core (7); wherein the second magnet (4) is disposed in the middle of two first magnets (3) in each magnetic pole along a direction parallel to a cross-sectional circumferential chord of the rotor core (7), the second magnet (4) is located at a middle and lower portion of two first magnets (3) of each magnetic pole corresponding to the second magnet (4) at a diameter direction, and a length of the second magnet (4) in a perpendicular direction to the diameter is less than ⅔ of a length between inner ends of two adjacent first magnets (3); wherein the third magnet (10) is disposed at a middle of outer ends of the two adjacent first magnets (3), and a diameter of the third magnet (10) is equal to the length of the second magnet (4) in the perpendicular direction to the diameter; wherein the magnetic isolated air gap (8) passing through the rotor core (7) is disposed at an inner end of the first magnet (3), the magnetic isolated air gap (8) extends from the inner end of the first magnet (3) to two sides of the inner end of the first magnet (3), an intermediate outer side of the magnetic isolated air gap (8) is connected to the first magnet (3), a left side of the magnetic isolated air gap (8) extends to a right end of a second magnet (4) adjacent to the left side of the magnetic isolated air gap (8), the left side of the magnetic isolated air gap (8) is disconnected with the right end of the second magnet (4) adjacent to the left side of the magnetic isolated air gap (8), and the magnetic isolated air gap (8) is symmetric with respect to the first magnet; and wherein the rotor core (7) is press-fitted on the shaft (1).

2. The driving motor with hybrid excitation of electromagnetism and invisible magnetic pole according to claim 1, wherein polarities of outsides of the two first magnets (3), a polarity of an outside of the second magnet (4) and a polarity of an outside of the third magnets (10) in a single magnetic pole of the rotor core (7) are the same N poles; and a polarity of an intermediate portion of two adjacent magnetic poles is collectively formed by S poles of the first magnets (3), the second magnets (4) and the third magnets (10) of the two adjacent magnetic poles through the rotor core (7) as an invisible S pole.

3. The driving motor with hybrid excitation of electromagnetism and invisible magnetic pole according to claim 1, wherein a thickness of the second magnet (4) in a magnetizing direction is smaller than a thickness of the first magnet (3) in the magnetizing direction, and a thickness of the third magnet (10) in the magnetizing direction is smaller than the thickness of the second magnet (4) in the magnetizing direction.

\* \* \* \* \*